US009130650B1

(12) United States Patent
Acimovic (10) Patent No.: US 9,130,650 B1
(45) Date of Patent: Sep. 8, 2015

(54) TRANSFORMER BASED CIRCUIT FOR REDUCING EMI RADIATION IN HIGH SPEED CMOS SERDES TRANSMITTERS (71) Applicant: PMC-Sierra US, Inc., Sunnyvale, CA (US)

(72) Inventor: Predrag Acimovic, Burnaby (CA)

(73) Assignee: PMC-SIERRA US, INC., Sunnyvale, CA (US)

( * ) Notice: Subject to any disclaimer, the term of this patent is extended or adjusted under 35 U.S.C. 154(b) by 131 days.

(21) Appl. No.: 14/068,502

(22) Filed: Oct. 31, 2013

(51) Int. Cl.
H04B 3/28 (2006.01)
H04B 3/30 (2006.01)

(52) U.S. Cl.
CPC ........................................ H04B 3/30 (2013.01)

(58) Field of Classification Search
CPC ..... H04B 3/30; H04L 25/085; H04L 25/0274
USPC ............................... 333/12; 379/416; 375/346
See application file for complete search history.

(56) References Cited

U.S. PATENT DOCUMENTS

| 5,077,543 | A | 12/1991 | Carlile |
| 7,005,939 | B2 | 2/2006 | Zerbe et al. |
| 7,385,466 | B2 | 6/2008 | Suenaga et al. |
| 7,728,692 | B2 | 6/2010 | Fortier |
| 8,004,330 | B1 | 8/2011 | Acimovic et al. |
| 8,514,951 | B2 * | 8/2013 | Tavassoli Kilani et al. .. 375/257 |

OTHER PUBLICATIONS

Kim et al., "An 8Gb/s Transformer Boosted Transformer with >Vss Swing", ISSCC 2006, Feb. 6, 2006, San Francisco, California, 10 pages.
Acimovic, "Novel Band-Stop Mode Filter for High-Speed Digital Transmission", DesignCon 2007, Jan. 30, 2007, Santa Clara, California, US, 24 pages.

* cited by examiner

Primary Examiner — Robert Pascal
Assistant Examiner — Kimberly Glenn
(74) Attorney, Agent, or Firm — Dennis R. Haszko (57) ABSTRACT

This disclosure provides methods and apparatus for processing differential signals having non-inverted and inverted signals. An example apparatus has first and second circuit arms, each arm connected to receive one of the input signals. Each arm has a post-cursor branch comprising a delay, an inverter and a series terminating resistance connected between the first input and a first circuit arm common node, and a main cursor branch comprising a buffer and a series terminating resistance connected between the first input and the first circuit arm common node. A first transformer has a primary winding connected between the first circuit arm common node and a first output and a secondary winding connected between an output of the buffer of the main cursor branch of the second arm and ground, with a capacitor and a resistor connected in series between the secondary winding and ground. A second transformer has a primary winding connected between the second circuit arm common node and a second output and a secondary winding connected between an output of the buffer of the main cursor branch of the first arm and ground, with a capacitor and a resistor connected in series between the secondary winding of the second transformer and ground.

24 Claims, 7 Drawing Sheets

TRANSFORMER BASED CIRCUIT FOR REDUCING EMI RADIATION IN HIGH SPEED CMOS SERDES TRANSMITTERS

FIELD

The present disclosure relates generally to the field of data communication. More particularly, aspects of the present disclosure may be applied in data communication systems where the data is sent differentially over long transmission lines. Aspects can also be applied in any electronic printed circuit board (PCB) or integrated circuit (IC) to reduce common mode radiation from transmission lines carrying differential signals.

BACKGROUND

The use of electronic devices has increased in many areas of everyday life. Almost in any area of the world, the space around people is immersed with the variety of emitted electro-magnetic waves. These electro-magnetic (EM) emissions vary in power and frequency occupancy. The use of the frequency spectrum is regulated by commissions delegated by governments. Some of the devices claim the spectrum as part of their intended operation like cellular phones, but some devices like computers and displays radiate unwanted emissions. These unwanted emissions compromise the operation of other electronic devices. EM emissions can cause a malfunction of devices like pacemakers or airplane navigation or landing instruments and can be life threatening.

All equipment has to pass the EM interference (EMI) requirements set by different government bodies. The Federal Communications Commission (FCC) in the United States and CISPR in Europe are regulating amounts of radiated emissions in different classes depending on the place of use. The class A regulates emissions in industrial environment and class B regulates emissions in residential environment. The class A has more relaxed specifications than class B. Another class is so called open-box equipment where equipment that is sold separately for plugging in to other devices, like in the case of many computer related products, has to meet slightly less stringent specifications than the product they are to be plugged in to.

It is mandatory to satisfy EMI requirements. If a device fails to pass EMI testing, it is very expensive to redesign the device to meet EMI requirements. Such redesign can also introduce long delays before the devices can be sold.

The high-speed digital signals in a SERDES transmitter are usually carried over PCB boards, backplanes, or cables using differential lines. These signals can contain an unwanted common mode signal that results in failing to meet the EMI (electro-magnetic interference) requirements.

The high speed SERDES transmitters usually cause EMI violations at discrete frequencies at the symbol rate of the differential signal. The main cause of non-linear common mode generation in high speed SERDES transmitter is the difference between rise and fall edges of positive and negative signals at the output, as described for example in P. Acimovic "Novel Band-Stop Mode Filter For High-Speed Digital Transmission", DESIGNCON 2007, which is hereby incorporated by reference herein. Good engineering design can minimize the difference between rise and fall edges, but not over process-voltage-temperature (PVT) variations.

There is a substantial amount of prior art devices which use coupled inductors for the purpose of filtering the common mode signal.

Figure 1:
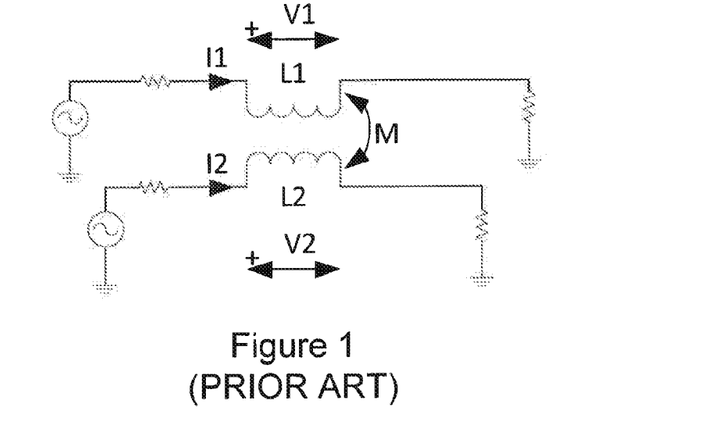
FIG. 1 schematically illustrates an example common mode choke according to the prior art.

The most common way of implementing the common mode filtering is the use of a common mode choke as shown in FIG. 1. The operation of the circuit in FIG. 1 is well known. A high value of magnetic coupling coefficient between L1 and L2 in the FIG. 1 circuit is essential for effective common mode signal reduction. For this reason a material with high magnetic permeability is used in transformer construction. This is necessary because the differential signal insertion loss is increased if the magnetic coupling coefficient value is below 0.95. Current state of art series common mode chokes are typically not useful above 5 Gbps. Circuits with several common mode chokes making common mode filter, as disclosed for example in U.S. Pat. No. 5,077,543, are only usable at even lower data rates.

U.S. Pat. No. 7,005,939, discloses, in FIGS. 7 and 8, essentially the same well known circuit of FIG. 1, but implemented on a silicon die. It is currently not possible to integrate CMOS circuits with high permeability magnetic materials on a silicon die, therefore there is little possibility to achieve magnetic coupling coefficient above 0.95, which would be necessary for effective filtering of common mode signal spurs. Also, the transformer disclosed U.S. Pat. No. 7,005,939 in is not perfectly balanced, which can be seen in FIG. 8 thereof. This can lead to number of signal integrity degradations and makes this approach difficult to use for data rates above 20 Gbps.

Referring to FIG. 6 of U.S. Pat. No. 7,385,466 elements 105a and 105b form a regular common mode choke. This implementation uses ferromagnetic material and the design depends on successful implementation of common mode choke that presents a high common mode impedance. The integration of ferromagnetic materials on a silicon die is not possible for current state of art CMOS integrated circuits, so this is not a useful topology in a VLSI IC design.

U.S. Pat. No. 7,728,692 discloses primary and secondary winding elements (122, 124) of a transformer element (120) (see FIGS. 3 and 4) are connected in series across the two line conductors, with common point connected to impedance Z1. This method is obviously totally different than our proposed method.

Another prior art approach is disclosed in Kim et al. (Jintae Kim, Hamid Hatamhani and Chih-Kong Ken Yang titled "An 8 Gb/s Transformer Boosted Transformer with >Vss Swing", 2006 IEEE International Solid-State Circuits Conference, 1-4244-0079-1/06). Kim et al. discloses a circuit implementation in FIG. 4.8.2 thereof that uses a transformer in the transmitter output, but in a different configuration than our proposed circuit. The circuit of Kim et al. actually increases the common mode signal spurs due to further enhancing the difference between the rise and fall edge disparity.

The circuit of Kim et al. also cannot be used with programmable de-emphasis, as it would suffer from undershoot. This would reduce the eye opening and in some severe cases even close the eye in the signal eye diagram. This is clearly visible in their waveform and in the eye diagrams they presented (see FIG. 4.8.6 of Kim et al.) If the circuit of Kim et al. used de-emphasis, it would have a large drop of signal voltage at instances when de-emphasis circuit is active, and it would most likely close the eye. Therefore, the circuit in of Kim et al. is not useful for channels that have large insertion loss at the Nyquist frequency, which is usually the case for data rates above 10 Gbps.

The inventor has determined a need for apparatus and methods for reducing the probability of equipment failing to pass EMI testing, and in particular, for reducing problems associated with common mode signals in SERDES transmitters.

SUMMARY

One aspect provides an apparatus comprising a first circuit arm having a first input for receiving a non-inverted input signal of a differential signal and a first output for outputting a non-inverted output signal of the differential signal, the first circuit arm comprising: a first post-cursor branch connected to receive the non-inverted input signal, the first post-cursor branch comprising a delay, an inverter and a series terminating resistance connected between the first input and a first circuit arm common node; a first main cursor branch connected to receive the non-inverted input signal, the first main cursor branch comprising a buffer and a series terminating resistance connected between the first input and the first circuit arm common node; and a first transformer having a primary winding connected between the first circuit arm common node and the first output; and a second circuit arm having a second input for receiving an inverted input signal of the differential signal and a second output for outputting an inverted output signal of the differential signal, the second circuit arm comprising: a second post-cursor branch connected to receive the inverted input signal, the second post-cursor branch comprising a delay, an inverter and a series terminating resistance connected between the second input and a second circuit arm common node; a second main cursor branch connected to receive the inverted input signal, the second main cursor branch comprising a buffer and a series terminating resistance connected between the second input and the second circuit arm common node; and a second transformer having a primary winding connected between the second circuit arm common node and the second output. A secondary winding of the first transformer is connected between an output of the buffer of the second main cursor branch and ground, with a capacitor and a resistor connected in series between the secondary winding of the first transformer and ground, and a secondary winding of the second transformer is connected between an output of the buffer of the first main cursor branch and ground, with a capacitor and a resistor connected in series between the secondary winding of the second transformer and ground.

The capacitor connected between the secondary winding of the first transformer and ground and the capacitor connected between the secondary winding of the second transformer and ground may have variable capacitances.

The first circuit arm may comprise a front end delay element connected between the first input and the first post-cursor and first main cursor branches, and a first pre-cursor branch comprising an inverter and a series terminating resistance connected between the first input and the first circuit arm common node, and the second circuit arm may comprises a front end delay element connected between the second input and the second post-cursor and second main cursor branches, and a second pre-cursor branch comprising an inverter and a series terminating resistance connected between the second input and the second circuit arm common node.

The first transformer may comprise a tertiary winding connected between the output of the buffer of the first main cursor branch and ground, with a capacitor and a resistor connected in series between the tertiary winding of the first transformer and ground, and the second transformer may comprise a tertiary winding connected between the output of the buffer of the second main cursor branch and ground, with a capacitor and a resistor connected in series between the tertiary winding of the second transformer and ground.

The resistor connected between the secondary winding of the first transformer and ground and the resistor connected between the secondary winding of the second transformer and ground may have variable resistances, or may have predetermined resistances set based on readings from a process sensor.

A magnetic coupling coefficient between the first and second windings of each of the first and second transformers may be between about 0.2 and about 0.5. The first and second windings of each of the first and second transformers may have inductances in the range of about 0.15 nH to 0.5 nH.

Another aspect provides a method comprising: receiving an input differential signal comprising a non-inverted signal and an inverted signal; for each one of the non-inverted signal and the inverted signal: splitting the one of the non-inverted signal and the inverted signal into a main cursor path and a post-cursor path; in the main cursor path, buffering the signal; in the post-cursor path, delaying the signal by one clock cycle and inverting the signal; combining the outputs of the main cursor path and the post-cursor path at a common node to generate a combined signal; and, magnetically coupling the combined signal with a buffer output from the main cursor path for the other of the non-inverted signal and the inverted signal to generate a cross-coupled signal; and outputting the cross-coupled signals.

The method may comprise varying a capacitance between each of two inductors receiving the buffer outputs from the main current paths for the other of the non-inverted signal and the inverted signal and ground based on a data rate of the input differential signal.

The method may comprise, prior to splitting the one of the non-inverted signal and the inverted signal into the main cursor path and the post-cursor path: splitting the one of the non-inverted signal and the inverted signal into a pre-cursor path and an input path for the main cursor path and the post-cursor path; in the pre-cursor path, inverting the signal; and, in the input path, delaying the signal by one clock cycle.

The method may comprise, in addition to magnetically coupling the combined signal with the buffer output from the main cursor path for the other of the non-inverted signal and the inverted signal, magnetically coupling the combined signal with a buffer output from the main cursor path for the one of the non-inverted signal and the inverted signal.

The method may comprise tuning a capacitance between each of two inductors receiving the buffer outputs from the main current paths for the one of the non-inverted signal and the inverted signal and ground to provide a resonant frequency of 3/2 of a frequency of the input differential signal.

Another aspect provides an apparatus comprising: a first circuit arm having a first input for receiving a non-inverted input signal of a differential signal and a first output for outputting a non-inverted output signal of the differential signal, the first circuit arm comprising: a first post-cursor branch connected to receive the non-inverted input signal, the first post-cursor branch comprising a delay, an inverter and a series terminating resistance connected between the first input and a first circuit arm common node; a first main cursor branch connected to receive the non-inverted input signal, the first main cursor branch comprising a buffer and a series terminating resistance connected between the first input and the first circuit arm common node; and a first transformer having a primary winding connected between the first circuit arm common node and the first output, and a secondary winding connected between an output of the buffer of the first main cursor branch and ground, with a capacitor and a resistor connected in series between the secondary winding of the first transformer and ground; and a second circuit arm having a second input for receiving an inverted input signal of the differential signal and a second output for outputting an inverted output signal of the differential signal, the second circuit arm comprising: a second post-cursor branch connected to receive the inverted input signal, the second post-cursor branch comprising a delay, an inverter and a series terminating resistance connected between the second input and a second circuit arm common node; a second main cursor branch connected to receive the inverted input signal, the second main cursor branch comprising a buffer and a series terminating resistance connected between the second input and the second circuit arm common node; and a second transformer having a primary winding connected between the second circuit arm common node and the second output, and a secondary winding connected between an output of the buffer of the second main cursor branch and ground, with a capacitor and a resistor connected in series between the secondary winding of the second transformer and ground.

The first circuit arm may comprise a front end delay element connected between the first input and the first post-cursor and first main cursor branches, and a first pre-cursor branch comprising an inverter and a series terminating resistance connected between the first input and the first circuit arm common node, and the second circuit arm may comprise a front end delay element connected between the second input and the second post-cursor and second main cursor branches, and a second pre-cursor branch comprising an inverter and a series terminating resistance connected between the second input and the second circuit arm common node.

The capacitor connected between the secondary winding of the first transformer and ground and the capacitor connected between the secondary winding of the second transformer and ground may have capacitances tuned to provide a resonant frequency of 3/2 of a frequency of the input differential signal.

Other aspects and features of the present disclosure will become apparent to those ordinarily skilled in the art upon review of the following description of specific embodiments in conjunction with the accompanying figures.

BRIEF DESCRIPTION OF DRAWINGS

Embodiments of the present disclosure will now be described, by way of example only, with reference to the attached Figures.

DETAILED DESCRIPTION

This disclosure presents new methods and apparatus for reducing electro-magnetic interference (EMI) radiation from high speed SERDES transmitters. EMI reduction is achieved by equalizing the difference between rising and falling edges of high speed differential transmitter signals. The equalization of the difference between rising and falling edges is achieved by means of magnetic coupling between positive (non-inverted) and negative (inverted) SERDES output signal arms.

The circuit that reduces the common mode signal spurs preferably does not degrade the performance of the differential signal at the output. The differential signal preferably does not have any additional insertion loss, suffer from any signal integrity degradation, nor have decreased signal to noise ratio.

In circuits according to the example embodiments described below, transformers are used to reduce the common mode signal spurs. The insertion loss of differential signal will increase if there is too much voltage drop across transformer windings which are connected in series to the output. Therefore, the self inductance of the transformer windings has to be very small. The inductance value depends on the data rate, with higher data rates calling for smaller inductance values to avoid insertion loss and reduction of output amplitude. For data rates above 10 Gbps practical values of inductances are below 1 nH. Also, the differential signal insertion loss will increase if parasitic capacitance is introduced by the addition of a circuit that reduces the common mode signal spurs. In circuits according to certain example embodiments, the self inductance of the transformer windings is small and parasitic capacitances associated with the transformer are extremely small because of the way the cross-coupling between positive and negative signals is achieved.

Circuits according to certain example embodiments also have perfect symmetry. This is important because any difference in parasitic elements, which affects the balance of the circuit, will potentially introduce the skew between positive and negative signal and increase noise. Example embodiments use two transformers, symmetrically connected to the positive and negative signal SERDES arms. This ensures that the output differential signal is balanced, which is essential for SERDES transmitter performance.

Circuits according to certain example embodiments result in more than 10 dB reduction common mode signal spurs, as described further below with reference to FIG. 4.

The non-linear common mode generation is responsible for discrete frequency spurs located at symbol rate and multiples of symbol rate, as described for example in P. Acimovic, "Novel Band-Stop Mode Filter For High-Speed Digital Transmission", DESIGNCON 2007, which is hereby incorporated by reference herein. The nonlinear common mode generation may be characterized by unipolar pulses in the common mode signal.

Figure 2A:
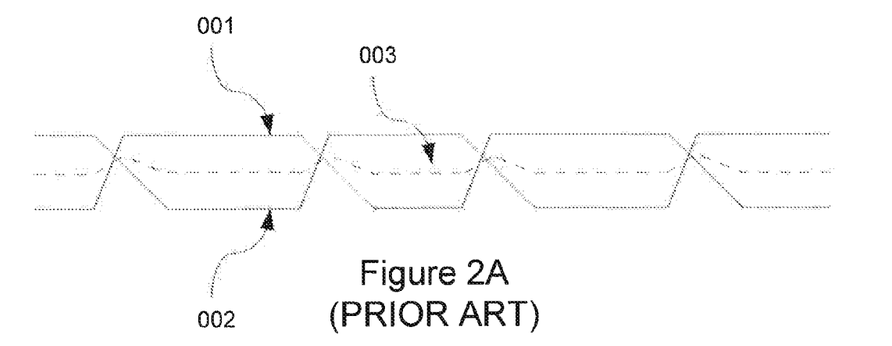
FIGS. 2A and 2B show waveforms of a pair of single ended signals that form a differential signal with mismatches in slew rates.
Figure 2B:
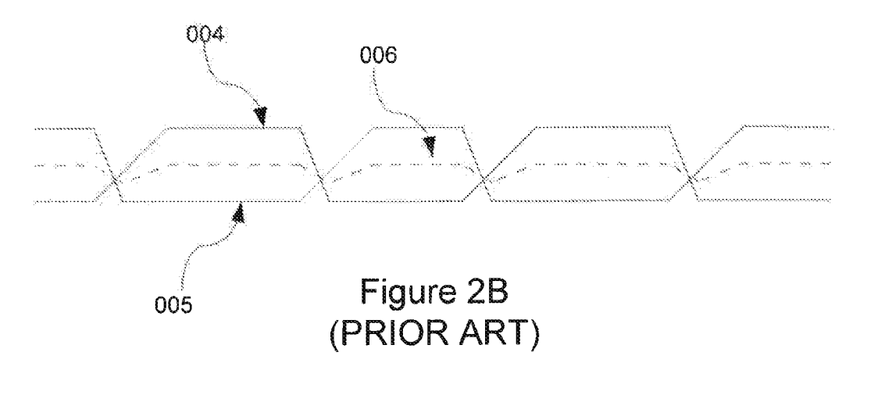

FIGS. 2A and 2B show two cases of different rise and fall edges of a differential signal of a typical prior art SERDES transmitter. FIG. 2A shows a positive signal (001) that has faster rise edges than fall edges. An identical driver circuit is used for generating both the positive (001) and the negative (002) or inverted signal. The negative signal (002) therefore also has faster rise edges than fall edges. The common mode signal (003) has only positive pulses in the case of FIG. 2A. FIG. 2B shows a positive signal (004) that has faster fall edges than rise edges. The negative signal (005) also has faster fall edges than rise edges. This results in common mode signal (006) that has only negative pulses.

It is impossible to achieve exact equality of rise and fall times in high speed SERDES transmitters over the entire pressure, voltage and temperature (PVT) range. For lower speed SERDES circuits (below 15 Gbps) it may be possible to use a circuit implementation as described in U.S. Pat. No. 8,004,330, which is hereby incorporated by reference herein. For very high speed data rates above 15 Gbps the slew rates of the transmitter can reach the limits of certain currently available state of the art CMOS devices, making the slew rates difficult to control. For different implementations of transmitters that use GaAs or InP devices such a technique can be extended to data rates above 20 Gbps. However, at higher data rates it is more difficult to adjust the rise and fall times of circuit drivers.

Circuits according to example embodiments disclosed herein use transformers to reduce the difference between rise and fall edges in SERDES transmitters. For a transformer, a voltage across the primary winding depends on the first derivative of the current in secondary winding. Example embodiments use current change in secondary winding to influence the voltage change across the primary winding. During any signal transition, the positive (non-inverted) signal has either a rising or falling edge, and the negative (inverted) signal has the opposite type of edge than the positive signal. By using transformers to couple the positive and the negative signal, we can reduce the difference between rise and fall edges at the output of SERDES transmitters.

If SERDES outputs are not perfectly balanced, the output differential signal will be converted to common mode noise and any common mode signal will be converted to differential mode noise. On a silicon die, transformer windings have to be implemented as planar transmission lines on metal layers. Implementations using one transformer to couple positive and negative signals are insufficiently balanced, resulting in common mode noise.

Besides the balance problem, the magnetic coupling coefficient must a have very high value (of at least 0.95, for example) for a single transformer to be effective in reducing common mode signal spurs at the circuit output. For this value of magnetic coupling coefficient the two windings would have to be in very close proximity, particularly given that current state of art of manufacturing of CMOS ICs cannot include high permeability magnetic materials in the design. The magnetic coupling coefficient in current CMOS ICs can reach a value of 0.9, but due to the winding proximity the capacitance between windings would be high. Such capacitance would undesirably attenuate the high speed differential signal.

To address these two problems, the inventor has determined a solution using a different topology that will allow for a balanced circuit. Preferred embodiments of circuits disclosed herein also reduce or minimize the parasitic capacitance between windings.

Figure 3:
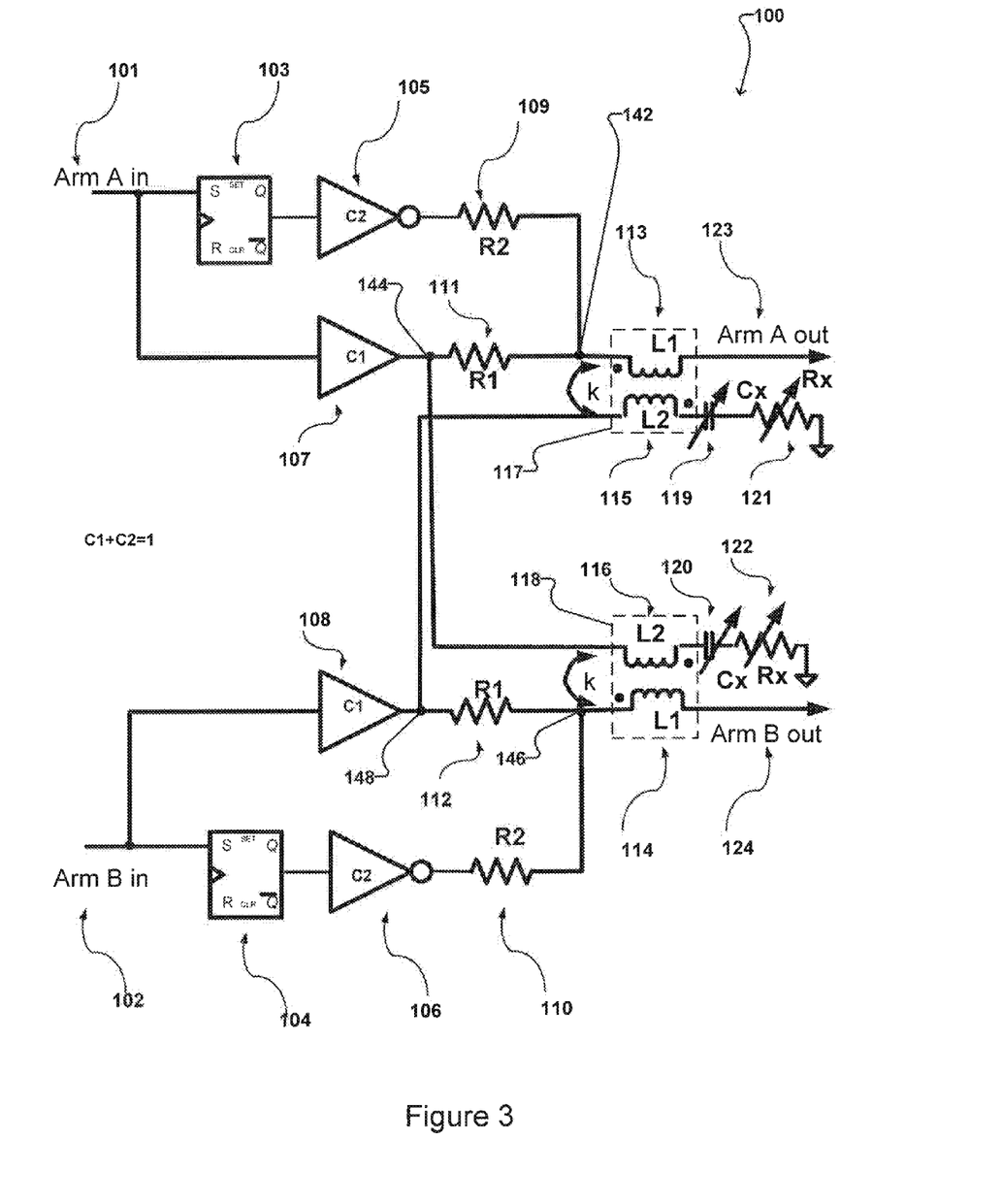
FIG. 3 shows an example circuit of a high speed differential transmitter with post-cursor de-emphasis capability according to one embodiment.

A basic example circuit according to one embodiment is shown in FIG. 3. Two transformers are used to achieve perfect balance between a non-inverted signal in Arm A and an inverted signal in Arm B. The primary windings of each transformer connect a respective driver via a series termination resistance R1 to the output of the circuit. The secondary windings of the transformers are used to cross-couple the positive and negative signals. In the illustrated example, the secondary winding circuit also contains a variable series capacitor Cx and variable series resistor Rx.

As shown in FIG. 3, an example implementation of a high speed differential transmitter with post cursor de-emphasis capability has two inputs (101) and (102) that respectively receive a non-inverted signal and an inverted signal. Each input (101/102) is coupled to a corresponding circuit arm (Arm A/Arm B), and each arm has two branches: a post-cursor branch and a main cursor branch. The post-cursor branch of Arm A comprises a clock delay element (103) and an inverter (105) connected in series, and the post-cursor branch of Arm B uses a clock delay element (104) and an inverter (106) connected in series. The clock delay element (104) delays the signal in the post-cursor branch of Arm B by one clock period. The clock delay element (104) may be combined with the inverter (106) in a single element in some embodiments (e.g. using the negative output of a flip flop). The main cursor branches of Arm A and Arm B comprise buffers (107) and (108). The signal scaling coefficient of the buffers (107/108) in Arm A and Arm B is C1, and relates to the cursor value. The signal scaling coefficient of the inverters (105/106) in Arm A and Arm B is C2, and relates to the post-cursor value.

The series termination for the main cursor branch of Arm A is a resistor (111) having resistance R1, and the series termination for the main cursor branch of Arm B is another resistor (112) having resistance R1. The series terminations for the post-cursor branches are resistors (109) and (110) for Arm A and Arm B, respectively, both having resistance R2. The common node (142) of resistors (111) and (109) of Arm A is connected to a primary winding (113) of a first transformer (117). The common node (146) of resistors (110) and (112) of Arm B is connected to a primary winding (114) of a second transformer (118). The other side of the primary winding (113) of the first transformer (117) is connected to the output of Arm A (123), and the other side of the primary winding (114) of the second transformer (118) is connected to the output of Arm B (124). The primary windings (113) and (114) each have an inductance L1.

A secondary winding (115) of the first transformer (117) is connected to a node (148) at the output of Arm B buffer (108) (i.e. between the buffer (108) and the resistor (112)). The other side of the secondary winding (115) is connected to a capacitor (119) and a resistor (121). The capacitor (119) may have a variable capacitance Cx, and the resistor (121) may have a variable resistance Rx, as discussed below. A secondary winding (116) of the second transformer (118) is connected a node (144) at the output of Arm A buffer (107) (i.e. between the buffer (107) and the resistor (111)). The other side of the secondary winding (116) is connected to a capacitor (120) and a resistor (122). The capacitor (120) may have a variable capacitance Cx, and the resistor (122) may have a variable resistance Rx, as discussed below. The secondary windings (115) and (116) each have an inductance L2. The secondary winding inductance L2 can be different from the primary winding inductance L1.

The transformers (117) and (118) are preferably implemented using the same layout on a silicon die in order to preserve balance of the structure. This can be easily implemented by one skilled in the art CMOS IC layout. Inductance value L1 of primary winding may be very small, for example in the range of about 0.15 nH to 0.5 nH for data rates of 18 Gbps to 40 Gbps. The magnetic coupling coefficient k between the primary and secondary windings of each transformer (117/118) may also have a small value, for example between about 0.2 and about 0.5.

The capacitors (119) and (120) need not to be implemented as variable capacitors in all embodiments. In order to optimize performance over a wide range of different data rates, in preferred embodiments the capacitors (119) and (120) are implemented as variable capacitors.

In certain preferred embodiments, the resistors (121) and (122) have variable resistances and the best performance is achieved when the resistances are adjusted to minimize the common mode spur at the data rate frequency. The adjustment of the resistances can be done by using various methods. In one option, adjustment of the resistances can be done by using a feedback circuit that detects common mode signal voltage at the outputs (123) and (124). The feedback circuit can be implemented in number of ways, such as, for example similar to circuits described in U.S. Pat. No. 8,004,330, which is incorporated by reference above. Because of inherent negative feedback of the circuit, it is also possible to have the resistances of the resistors (121) and (122) set to specific predetermined values based on readings from a process sensor.

The capacitors (119) and (120) set the resonance frequency of the corresponding transformer secondary winding (115/116) circuit. The capacitance of the capacitors (119) and (120) may be used to select which portion of the spectrum is to be transferred from the secondary winding (115/116) to the corresponding primary winding (113/114). The resonant secondary winding (115/116) circuit will have a quality factor greater than 1 at frequencies determined by the corresponding capacitor (119/120) and the secondary winding inductance L2. This allows effective amplification of peak specific frequencies to be coupled to the corresponding primary winding (113/114). The resonant peaking in the secondary winding (115/116) circuit avoids the need for a large magnetic coupling coefficient between the primary winding (113/114) and secondary winding (115/116) of each transformer (117/118). By allowing for a small magnetic coupling coefficient, the primary and secondary windings (113 and 114/115 and 116) can be placed further apart. The small magnetic coupling coefficient of each transformer (117/118) also results in smaller parasitic capacitance, thereby reducing the problem of attenuation of the output differential signal.

As one of skill in the art will appreciate, providing two transformers that require only relatively small magnetic coupling coefficients facilitates implementation of a circuit according to the FIG. 3 embodiment as a silicon VLSI (very large scale integration) monolithic circuit. In order to minimize the area occupied by the transformers, some embodiments use a vertical or stacked configuration for one or both transformers, in which the primary winding is on higher metal layers, that have lower resistance, and the secondary winding is on lower metal layers, with the centers of the two windings of the transformer on the same "vertical" axis (e.g., an axis generally perpendicular to the layers). As one of skill in the art will appreciate, since only a relatively small coupling coefficient is required, many other two inductor transformer configurations are possible. For example some embodiments may use a planar configuration in which case the primary and secondary winding of each transformer would be on same metal layer. The two windings in this case can be interleaved, or due to the requirement of only a relatively small magnetic coupling coefficient, the primary winding can be implemented inside the secondary winding or vice versa.

Another advantage of the arrangement of the example circuit of FIG. 3 is that a larger coupling voltage in the primary winding (113/114) can be obtained by increasing the inductance L2 of the secondary winding (115/116) without having to increase the inductance L1 of the primary winding (113/114). This can also be used to decrease the self capacitance of the primary winding (113/114), as well as the mutual capacitance between the primary and secondary windings.

Circuits according to certain preferred embodiments can easily be implemented in accordance with high speed signaling standards requirements for signal de-emphasis. These standards require circuit post-cursor emphasis capability and, in many cases, they also require circuit pre-cursor emphasis capability. Some standards require large levels of de-emphasis up to 12 dB. Circuits according to preferred embodiments do not suffer from the under/over shoot effects like the prior art circuit of Kim et al., as the only time the signal magnetic coupling from the opposite arm to the main output happens is when there is a transition of cursor data from 0 to 1 or vice versa. There will not be magnetic coupling at times when the pre-cursor or post-cursor branch is "active." The pre-cursor and post-cursor branches only contribute to the output of the overall circuit at times when there is no change from one data interval to the next data interval. The pre-cursor and post-cursor branches basically reduce the output signal voltage in data intervals which correspond to no change of data, and can be referred to as "active" during such intervals, and "inactive" during intervals when the data changes. Signal undershoots or overshoots are typically only expected in data intervals which correspond to times when the data changes. Therefore, the circuit implementation of FIG. 3 will not suffer from the over/under shoot problems of the circuit disclosed in Kim et al.

The signals in Arm A and Arm B of FIG. 3 are complementary. The cross-coupling of positive (non-inverted) and negative (inverted) signals to reduce the difference between the rise and fall edges can yield up to 10 dB reduction of common mode signal spur at the output at data rate frequency, without affecting the signal integrity of the differential signal. Series resonance of secondary winding circuit allows the magnetic coupling coefficient of each transformer (117/118) to be very low, for example between 0.2 to 0.5. The inductances L1 and L2 may, for example, be approximately 0.15 nH to 0.5 nH for data rates between 18 Gbps to 40 Gpbs.

Figure 4:
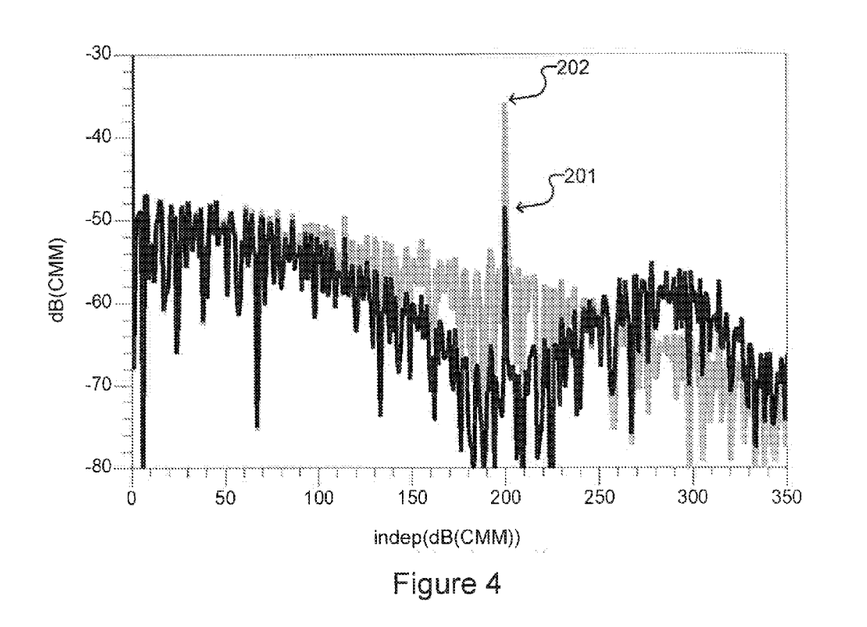
FIG. 4 is a graph showing reduction of common mode signal spur using cross-coupled signals according to one embodiment.

FIG. 4 graphically illustrates reduction of common mode signal spur in a simulation using cross-coupled signals in a circuit such as the example shown in FIG. 3. The black trace in FIG. 4 shows the common mode signal from a simulated circuit according to the FIG. 3 embodiment and the grey trace shows the common mode signal from a reference circuit identical to the circuit of FIG. 3 but without cross-coupled transformers. Pointers 201 and 202 respectively indicate the common mode signal spur of the FIG. 3 circuit and the reference circuit, and it can be seen that the common mode signal spur of the FIG. 3 circuit (201) is reduced by about 10 dB in relation to the common mode signal spur of the reference circuit (202).

Figure 5:
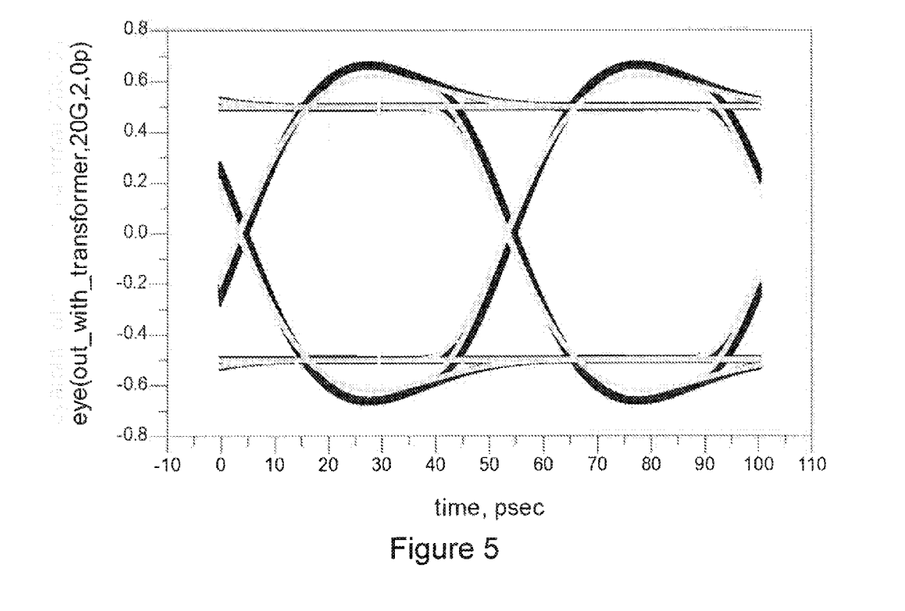
FIG. 5 is an eye diagram showing differential signals at the output of a transmitter according to one embodiment with a 25% de-emphasis.

While the common mode spur at data rate frequency is reduced by 10 dB, the signal integrity of differential signal is not adversely affected, as shown by the eye diagram of FIG. 5. The black trace in FIG. 5 is for a circuit with cross-coupled transformers such as the example shown in FIG. 3, and having 25% de-emphasis, and the grey trace is for a reference circuit identical to the circuit of FIG. 3 but without cross-coupled transformers. The signals from the FIG. 3 circuit have slightly faster differential signal edges, and there is no problem with undershoot.

Figure 6:
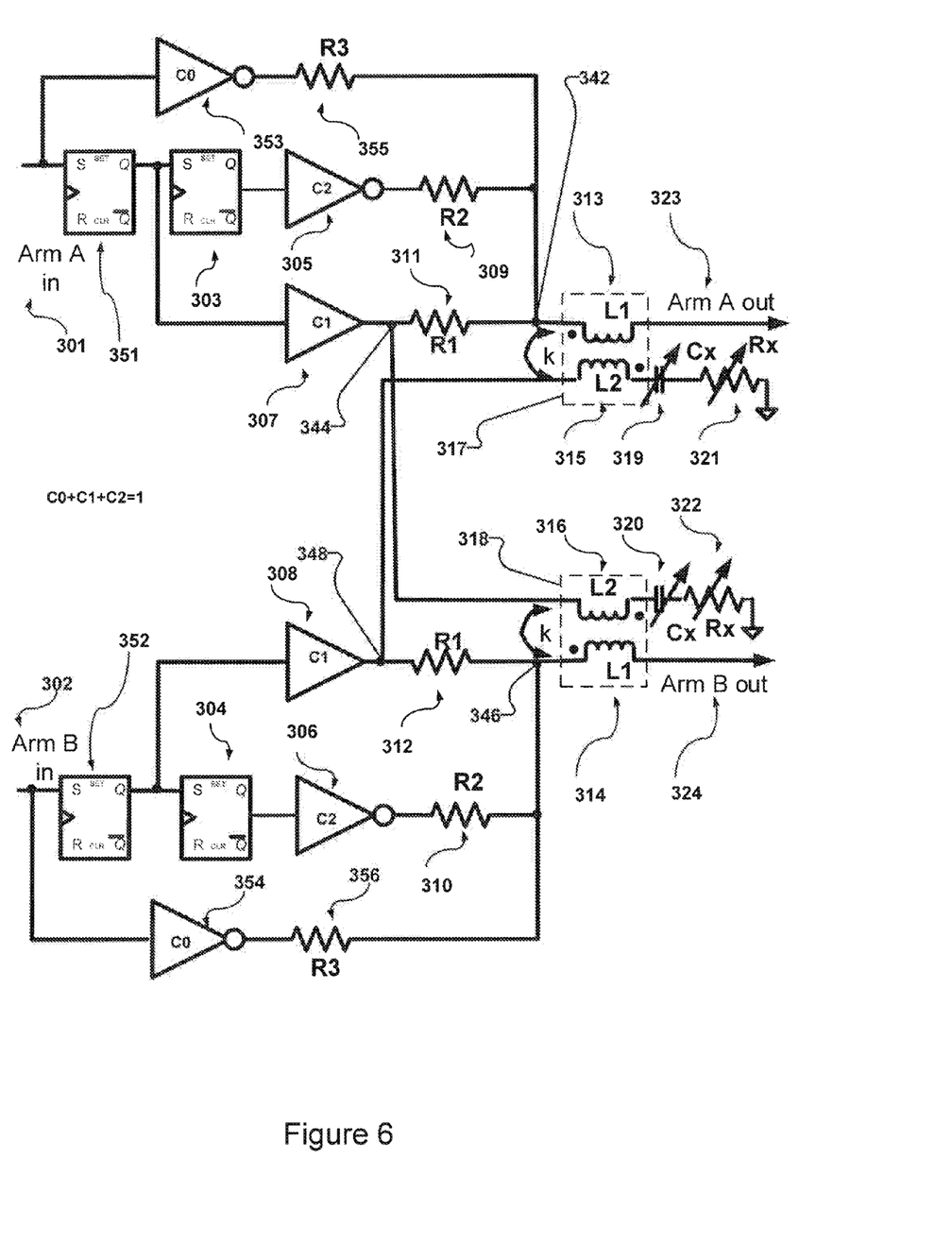
FIG. 6 shows an example circuit of a high speed differential transmitter with pre-cursor and post-cursor de-emphasis capability according to one embodiment.

Some standards require both pre-cursor and post-cursor transmitter capability. An example circuit implementation capable of this is shown in FIG. 6. The circuit of FIG. 6 is similar to the circuit of FIG. 3, and corresponding elements are labeled with corresponding reference numerals in the form of 3xx instead of 1xx and will not be described again to avoid repetition. The circuit of FIG. 6 differs from the circuit of FIG. 3 in that the FIG. 6 example includes, in each of Arm A and Arm B, an additional front-end delay element (351/352), and a pre-cursor branch parallel to the main cursor and post-cursor branch comprising an inverter (353/354) having a signal scaling coefficient C0 related to the pre-cursor value. The series termination for the pre-cursor branch of each of Arm A and Arm B is a resistor (355/356) having resistance R3.

Figure 7:
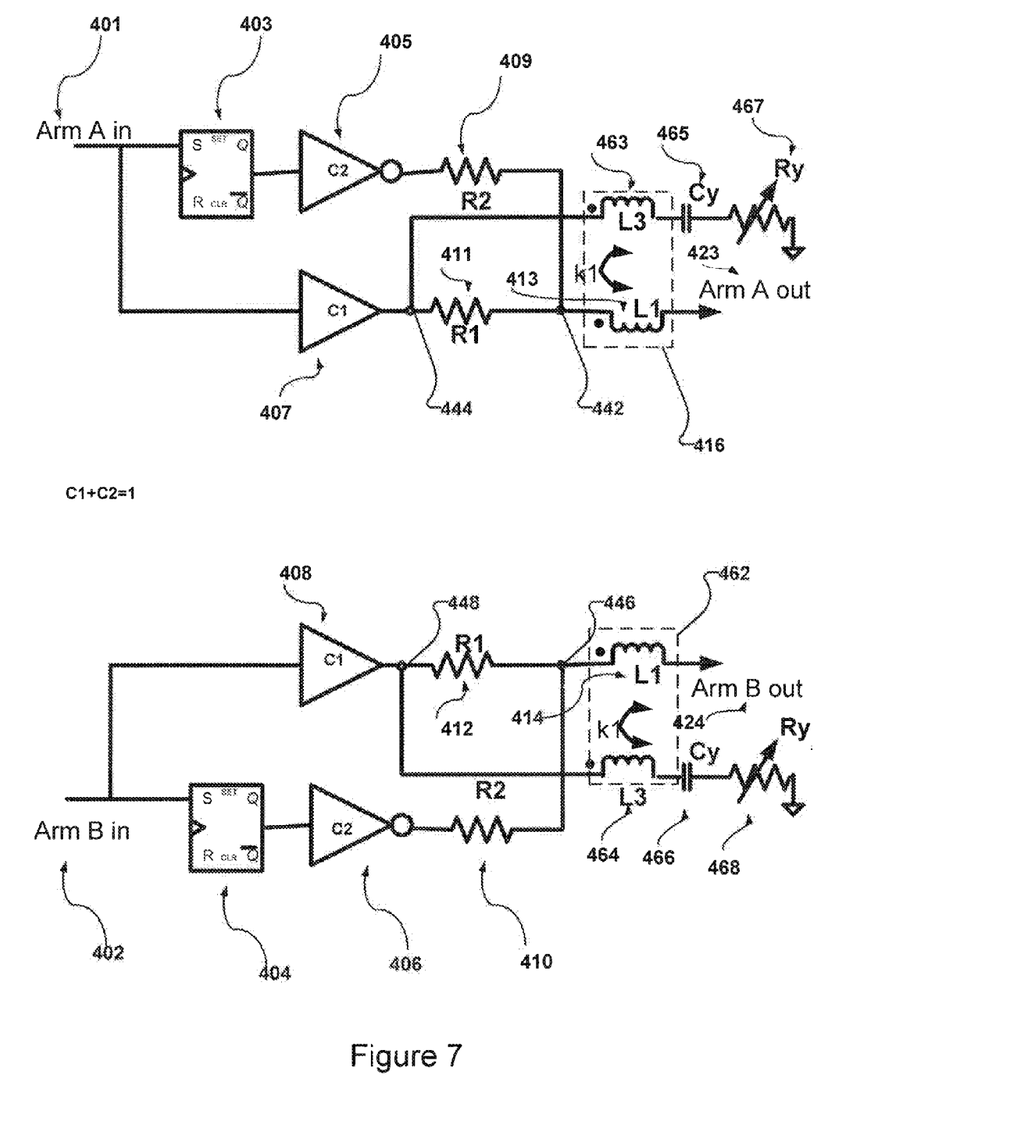
FIG. 7 shows an example circuit of a high speed differential transmitter with improved signal integrity but increased common mode spurs according to one embodiment.

Improvement of the integrity of the differential signal waveform can be achieved by enhancing the signal around 3/2 of data rate frequency. FIG. 7 shows a basic example of such a circuit which provides enhanced signal integrity, but with increased common mode spurs. Sometimes when common mode signal spurs are not a problem, for example for communication between a SERDES transmitter and receiver that are on the same board, this circuit can have merits. In the present disclosure the example circuit of FIG. 7 is used to facilitate the explanation of a more complex circuit discussed below with reference to FIG. 10, which further reduces the common mode signal spurs in comparison to the basic example circuit of FIG. 3.

Figure 8:
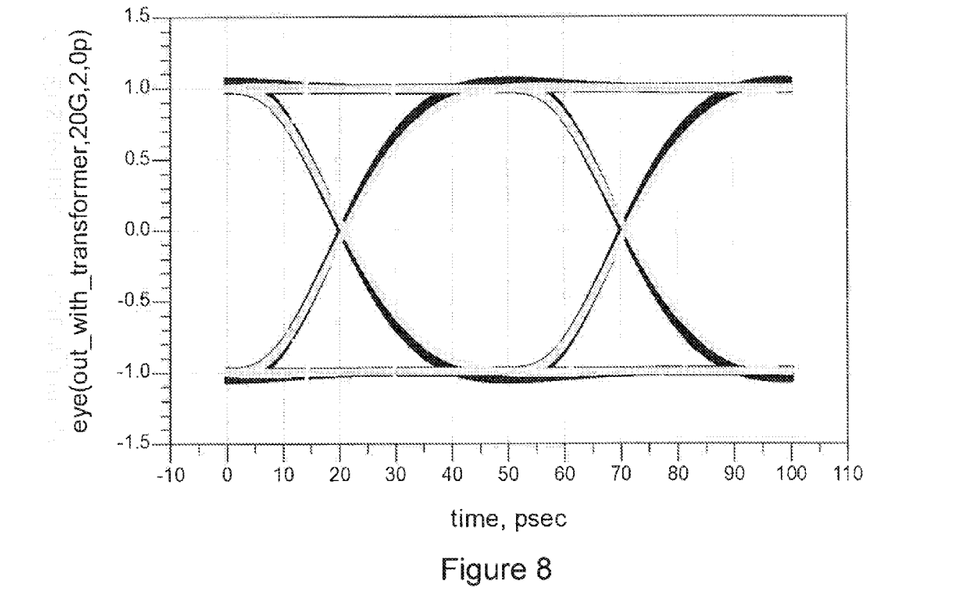
FIG. 8 is an eye diagram showing differential signals at the output of a transmitter according the FIG. 7 embodiment.
Figure 9:
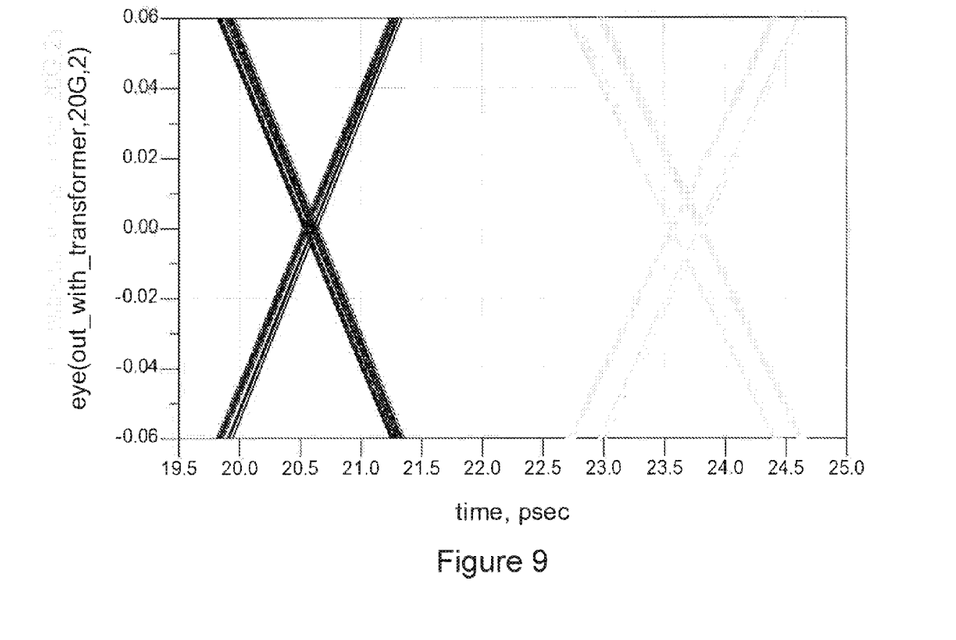
FIG. 9 shows a zero crossing portion of the eye diagram of FIG. 8.

The circuit of FIG. 7 is similar to the circuit of FIG. 3, and corresponding elements are labeled with corresponding reference numerals in the form of 4xx instead of 1xx and will not be described again to avoid repetition. The circuit of FIG. 7 differs from the circuit of FIG. 3 in that in the FIG. 7 example there are not cross-coupling transformers between Arm A and Arm B. Instead, the circuit of FIG. 7 includes a transformer (461/462) in each of Arms A and B, with a secondary winding (463/464) connected to the node (444/448) at the output of the respective buffer (407/408) (i.e. between the buffer (407/408) and the resistor (411/412)), with the other side of the secondary winding (463/464) connected to a capacitor (465/466) having a capacitance Cy tuned to 3/2 of the data rate frequency, and a resistor (467/468) having a variable resistance Ry that may be adjusted to set the amount of the power spectrum around 3/2 of the data rate frequency (3rd harmonic of Nyquist frequency) that is coupled into the primary winding (413/414) using the magnetic coupling coefficient k1 so there is no overshoot or undershoot. The expression "around 3/2 of the data rate frequency" in this context is used to refer to a range of frequencies centered on 3/2 of the data rate, such as for example from about 1.4 to about 1.6 times the data rate frequency. Adjustment of the variable resistance Ry affects the spectrum of the signal coupled into the primary winding (413/414). More of the signal in the frequency range around 3/2 of data rate is coupled to the output (423/424) in comparison with other frequency components of the signal, which basically shortens the rise and fall times of the output signal. This can be seen in the eye diagram of FIG. 8. The example circuit of FIG. 7 has shorter differential signal rise and fall times (black trace in FIG. 8) than a corresponding reference circuit without the transformers (461/462) providing the L1-L3 inductor coupling (grey trace in FIG. 8). FIG. 9 shows an enlarged view of a zero crossing portion of the plot of FIG. 8. The enlarged view of FIG. 9 shows that circuit from FIG. 7 has less jitter than the corresponding reference circuit without magnetic coupling.

The circuit in FIG. 7 differs from circuit in Kim et al. due to addition of capacitor Cy that tunes a resonant circuit at 3/2 of data rate frequency. This enables the circuit of FIG. 7 to be configured to select which portion of the signal spectrum to be magnetically coupled from the secondary windings (463 and 464) to the primary windings (413 and 414). The portion of the signal spectrum around 3/2 of the data rate frequency has the largest influence on slew rate of the rise and fall edges.

In the circuit in FIG. 7 the positive (non-inverted) signal is magnetically coupled by the windings (413/463) of the Arm A transformer (461) to a signal that is a copy of itself, and the negative (inverted) signal is also magnetically coupled by the windings (414/464) of the Arm B transformer (462) a signal that is a copy of itself. The magnetic coupling will speed up both rise and fall edges, but the faster edge slew rate will increase more than the slew rate of slower edge. Therefore this circuit creates an even larger difference between the fast and slow edges, and common mode signal spur level will increase. The example circuit of FIG. 7 should not be used when common mode signal spurs are potential problem. The example circuit of FIG. 7 can be used to improve signal integrity when the common mode signal spurs are not an issue.

Figure 10:
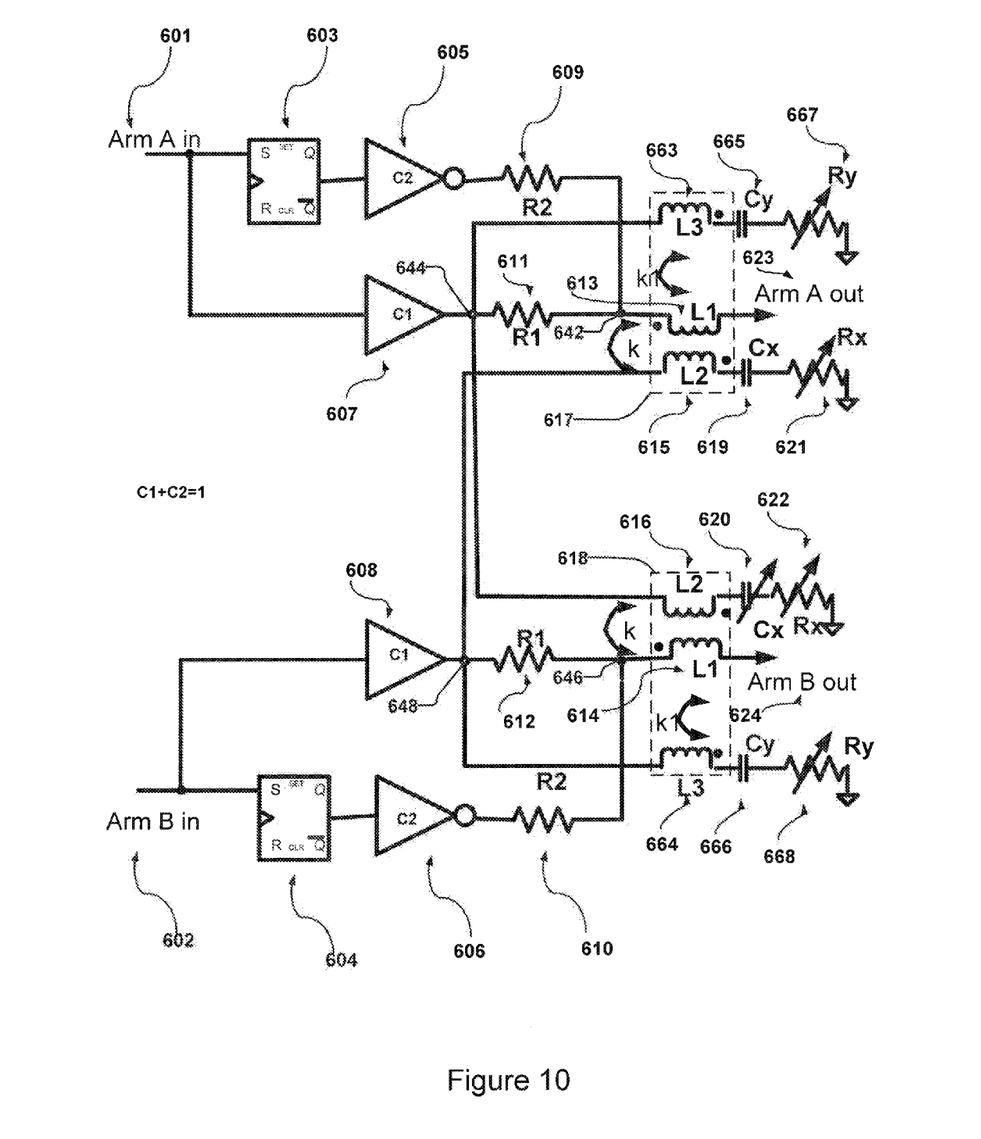
FIG. 10 shows an example circuit of a high speed differential transmitter with improved signal integrity and decreased common mode spurs according to one embodiment.

An example circuit that improves the common mode signal spurs even more than the example circuit of FIG. 3 is shown in FIG. 10. It should be noted that both the circuit of FIG. 3 and the circuit of FIG. 10 improve signal integrity and in terms of return loss and insertion loss of the signal, are similar to the circuit of FIG. 7. The circuit of FIG. 7 has slightly smaller rise and fall times in comparison to the circuit of FIG. 3, but the circuit of FIG. 3 has much better common mode signal suppression than the circuit of FIG. 7. The example circuit of FIG. 10 provides additional common mode signal spur reduction.

In operation, the circuit of FIG. 10 partially removes a portion of the signal spectrum around 3/2 of data rate frequency from the positive (non-inverted) signal and replace that portion with a similar portion of the signal spectrum around 3/2 of data rate frequency from the negative (inverted) signal. The same happens to the negative signal. The common mode spur reduction can be up to 15 dB in respect to a circuit that does not use the magnetic coupling. There is no negative effect on differential signal at the output.

The circuit of FIG. 10 has elements in common with circuits of FIG. 3 and FIG. 7, and corresponding elements are labeled with corresponding reference numerals in the form of 6xx instead of 1xx or 4xx, as the case may be, and will not be described again to avoid repetition. In the FIG. 10 circuit, each transformer (617/618) has three windings with inductances L1 (613/614), L2 (615/616) and L3 (663/664). The windings (663/664) having inductances L3 (which may be referred to as the third or tertiary windings in the FIG. 10 example) have reversed magnetic fluxes in relation to the primary windings (613/614) as compared to the windings (463/464) of the FIG. 7 circuit. This reduces common mode spurs, and also reduces the slew rate of the differential signal.

Cross-coupling between positive and negative signals, as shown in FIG. 10, so that magnetic fluxes of the primary windings (613/614) and secondary windings (615/616) with inductances L1 and L2 are aligned improves the slew rate and at the same time further reduces the common mode signal spurs. Therefore, the example circuit of FIG. 10 performs even better than the example circuit of FIG. 3. Simulations have indicated that the circuit of FIG. 10 provides additional improvement of common mode spur reduction of several dB.

Although not shown in the drawings, the circuit of FIG. 7 and the circuit of FIG. 10 may both be modified to include pre-cursor capability. For example, each of the circuits of FIG. 7 and FIG. 10 could include, in each arm, an additional front-end delay and a pre-cursor branch in parallel with the post-cursor and main cursor branches, as in the example shown in FIG. 6.

As is apparent from the foregoing, circuits according to the example embodiments disclosed above, and circuits similar thereto, may be implemented on a chip by one skilled in the art of designing coupled inductors on silicon dies to reduce EMI. Such implementations may take various forms depending on the desired application.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. An apparatus comprising:
   a first circuit arm having a first input for receiving a non-inverted input signal of a differential signal and a first output for outputting a non-inverted output signal of the differential signal, the first circuit arm comprising:
      a first post-cursor branch connected to receive the non-inverted input signal, the first post-cursor branch comprising a delay, an inverter and a series terminating resistance connected between the first input and a first circuit arm common node;
      a first main cursor branch connected to receive the non-inverted input signal, the first main cursor branch comprising a buffer and a series terminating resistance connected between the first input and the first circuit arm common node; and
      a first transformer having a primary winding connected between the first circuit arm common node and the first output;
   a second circuit arm having a second input for receiving an inverted input signal of the differential signal and a second output for outputting an inverted output signal of the differential signal, the second circuit arm comprising:
      a second post-cursor branch connected to receive the inverted input signal, the second post-cursor branch comprising a delay, an inverter and a series terminating resistance connected between the second input and a second circuit arm common node;
      a second main cursor branch connected to receive the inverted input signal, the second main cursor branch comprising a buffer and a series terminating resistance connected between the second input and the second circuit arm common node; and
      a second transformer having a primary winding connected between the second circuit arm common node and the second output;
   wherein a secondary winding of the first transformer is connected between an output of the buffer of the second main cursor branch and ground, with a capacitor and a resistor connected in series between the secondary winding of the first transformer and ground,
   and wherein a secondary winding of the second transformer is connected between an output of the buffer of the first main cursor branch and ground, with a capacitor and a resistor connected in series between the secondary winding of the second transformer and ground.

2. An apparatus according to claim 1 wherein the capacitor connected between the secondary winding of the first transformer and ground and the capacitor connected between the secondary winding of the second transformer and ground have variable capacitances.

3. An apparatus according to claim 1 wherein the first circuit arm comprises:
   a front end delay element connected between the first input and the first post-cursor and first main cursor branches; and
   a first pre-cursor branch comprising an inverter and a series terminating resistance connected between the first input and the first circuit arm common node,
   and wherein the second circuit arm comprises:
   a front end delay element connected between the second input and the second post-cursor and second main cursor branches; and
   a second pre-cursor branch comprising an inverter and a series terminating resistance connected between the second input and the second circuit arm common node.

4. An apparatus according to claim 3 wherein the capacitor connected between the secondary winding of the first transformer and ground and the capacitor connected between the secondary winding of the second transformer and ground have variable capacitances.

5. An apparatus according to claim 3 wherein the first transformer comprises a tertiary winding connected between the output of the buffer of the first main cursor branch and ground, with a capacitor and a resistor connected in series between the tertiary winding of the first transformer and ground,
   and wherein the second transformer comprises a tertiary winding connected between the output of the buffer of the second main cursor branch and ground, with a capacitor and a resistor connected in series between the tertiary winding of the second transformer and ground.

6. An apparatus according to claim 1 wherein the first transformer comprises a tertiary winding connected between the output of the buffer of the first main cursor branch and ground, with a capacitor and a resistor connected in series between the tertiary winding of the first transformer and ground,
   and wherein the second transformer comprises a tertiary winding connected between the output of the buffer of the second main cursor branch and ground, with a capacitor and a resistor connected in series between the tertiary winding of the second transformer and ground.

7. An apparatus according to claim 1 wherein the resistor connected between the secondary winding of the first transformer and ground and the resistor connected between the secondary winding of the second transformer and ground have variable resistances.

8. An apparatus according to claim 1 wherein the resistor connected between the secondary winding of the first transformer and ground and the resistor connected between the secondary winding of the second transformer and ground have predetermined resistances set based on readings from a process sensor.

9. An apparatus according to claim 1 wherein a magnetic coupling coefficient between the first and second windings of each of the first and second transformers is between about 0.2 and about 0.5.

10. An apparatus according to claim 1 wherein the first and second windings of each of the first and second transformers have inductances in the range of about 0.15 nH to 0.5 nH.

11. A method comprising:
receiving an input differential signal comprising a non-inverted signal and an inverted signal;
for each one of the non-inverted signal and the inverted signal:
splitting the one of the non-inverted signal and the inverted signal into a main cursor path and a post-cursor path;
in the main cursor path, buffering the signal;
in the post-cursor path, delaying the signal by one clock cycle and inverting the signal;
combining the outputs of the main cursor path and the post-cursor path at a common node to generate a combined signal; and,
magnetically coupling the combined signal with a buffer output from the main cursor path for the other of the non-inverted signal and the inverted signal to generate a cross-coupled signal; and
outputting the cross-coupled signals.

12. A method according to claim 11 comprising varying a capacitance between each of two inductors receiving the buffer outputs from the main current paths for the other of the non-inverted signal and the inverted signal and ground based on a data rate of the input differential signal.

13. A method according to claim 11 comprising, prior to splitting the one of the non-inverted signal and the inverted signal into the main cursor path and the post-cursor path:
splitting the one of the non-inverted signal and the inverted signal into a pre-cursor path and an input path for the main cursor path and the post-cursor path;
in the pre-cursor path, inverting the signal; and,
in the input path, delaying the signal by one clock cycle.

14. A method according to claim 12 comprising, prior to splitting the one of the non-inverted signal and the inverted signal into the main cursor path and the post-cursor path:
splitting the one of the non-inverted signal and the inverted signal into a pre-cursor path and an input path for the main cursor path and the post-cursor path;
in the pre-cursor path, inverting the signal; and,
in the input path, delaying the signal by one clock cycle.

15. A method according to claim 14 comprising, in addition to magnetically coupling the combined signal with the buffer output from the main cursor path for the other of the non-inverted signal and the inverted signal, magnetically coupling the combined signal with a buffer output from the main cursor path for the one of the non-inverted signal and the inverted signal.

16. A method according to claim 13 comprising, in addition to magnetically coupling the combined signal with the buffer output from the main cursor path for the other of the non-inverted signal and the inverted signal, magnetically coupling the combined signal with a buffer output from the main cursor path for the one of the non-inverted signal and the inverted signal.

17. A method according to claim 11 comprising, in addition to magnetically coupling the combined signal with the buffer output from the main cursor path for the other of the non-inverted signal and the inverted signal, magnetically coupling the combined signal with a buffer output from the main cursor path for the one of the non-inverted signal and the inverted signal.

18. A method according to claim 15 comprising tuning a capacitance between each of two inductors receiving the buffer outputs from the main current paths for the one of the non-inverted signal and the inverted signal and ground to provide a resonant frequency of 3/2 of a frequency of the input differential signal.

19. A method according to claim 16 comprising tuning a capacitance between each of two inductors receiving the buffer outputs from the main current paths for the one of the non-inverted signal and the inverted signal and ground to provide a resonant frequency of 3/2 of a frequency of the input differential signal.

20. A method according to claim 17 comprising tuning a capacitance between each of two inductors receiving the buffer outputs from the main current paths for the one of the non-inverted signal and the inverted signal and ground to provide a resonant frequency of 3/2 of a frequency of the input differential signal.

21. An apparatus comprising:
a first circuit arm having a first input for receiving a non-inverted input signal of a differential signal and a first output for outputting a non-inverted output signal of the differential signal, the first circuit arm comprising:
a first post-cursor branch connected to receive the non-inverted input signal, the first post-cursor branch comprising a delay, an inverter and a series terminating resistance connected between the first input and a first circuit arm common node;
a first main cursor branch connected to receive the non-inverted input signal, the first main cursor branch comprising a buffer and a series terminating resistance connected between the first input and the first circuit arm common node; and
a first transformer having a primary winding connected between the first circuit arm common node and the first output, and a secondary winding connected between an output of the buffer of the first main cursor branch and ground, with a capacitor and a resistor connected in series between the secondary winding of the first transformer and ground;
a second circuit arm having a second input for receiving an inverted input signal of the differential signal and a second output for outputting an inverted output signal of the differential signal, the second circuit arm comprising:
a second post-cursor branch connected to receive the inverted input signal, the second post-cursor branch comprising a delay, an inverter and a series terminating resistance connected between the second input and a second circuit arm common node;

a second main cursor branch connected to receive the inverted input signal, the second main cursor branch comprising a buffer and a series terminating resistance connected between the second input and the second circuit arm common node; and a second transformer having a primary winding connected between the second circuit arm common node and the second output, and a secondary winding connected between an output of the buffer of the second main cursor branch and ground, with a capacitor and a resistor connected in series between the secondary winding of the second transformer and ground.

22. An apparatus according to claim 21 wherein the first circuit arm comprises:

a front end delay element connected between the first input and the first post-cursor and first main cursor branches; and a first pre-cursor branch comprising an inverter and a series terminating resistance connected between the first input and the first circuit arm common node, and wherein the second circuit arm comprises:

a front end delay element connected between the second input and the second post-cursor and second main cursor branches; and a second pre-cursor branch comprising an inverter and a series terminating resistance connected between the second input and the second circuit arm common node.

23. An apparatus according to claim 21 wherein the capacitor connected between the secondary winding of the first transformer and ground and the capacitor connected between the secondary winding of the second transformer and ground have capacitances tuned to provide a resonant frequency of 3/2 of a frequency of the input differential signal.

24. An apparatus according to claim 22 wherein the capacitor connected between the secondary winding of the first transformer and ground and the capacitor connected between the secondary winding of the second transformer and ground have capacitances tuned to provide a resonant frequency of 3/2 of a frequency of the input differential signal.

\* \* \* \* \*